United States Patent
Minagoshi

(10) Patent No.: US 6,626,216 B2
(45) Date of Patent: Sep. 30, 2003

(54) PNEUMATIC TIRE HAVING HOLLOW PARTICLES IN BASE RUBBER

(75) Inventor: Akira Minagoshi, Izumiohtsu (JP)

(73) Assignee: Nokia Corporation, Espoo (FI)

( * ) Notice: Subject to any disclaimer, the term of this patent is extended or adjusted under 35 U.S.C. 154(b) by 103 days.

(21) Appl. No.: 09/884,962

(22) Filed: Jun. 21, 2001

(65) Prior Publication Data

US 2002/0014292 A1 Feb. 7, 2002

(30) Foreign Application Priority Data

Jun. 29, 2000 (JP) ........................... 2000-195976

(51) Int. Cl.$^7$ .................... B60C 1/00; B60C 11/00
(52) U.S. Cl. ................... 152/209.4; 152/209.5
(58) Field of Search ................ 152/209.4, 209.5

(56) References Cited

U.S. PATENT DOCUMENTS

| | | | |
|---|---|---|---|
| 4,396,052 A | * | 8/1983 | Ahagon et al. |
| 5,591,279 A | * | 1/1997 | Midorikawa et al. |
| 5,967,211 A | * | 10/1999 | Lucas et al. |
| 6,058,994 A | * | 5/2000 | Amino et al. |
| 6,245,860 B1 | * | 6/2001 | Materne et al. |
| 6,336,486 B1 | * | 1/2002 | Iwasaki et al. |

FOREIGN PATENT DOCUMENTS

| | | | |
|---|---|---|---|
| EP | A2361667 | | 4/1990 |
| EP | 543620 | * | 5/1993 |
| GB | 2066171 | * | 7/1981 |
| JP | A2-60803 | | 3/1990 |
| JP | 2-170840 | * | 7/1990 |
| JP | 4-55443 | * | 2/1992 |
| JP | 8-188012 | * | 7/1996 |

* cited by examiner

Primary Examiner—Steven D. Maki
(74) Attorney, Agent, or Firm—Squire, Sanders & Dempsey L.L.P.

(57) ABSTRACT

The present invention relates to a pneumatic tire that achieves, without degrading the steering stability, the reduction in road noise due to tire vibration when a vehicle drives on a rough road surface. The present pneumatic tire is characterized in that a tread portion is formed by at least two layers consisting of cap rubber on a road-contact surface side and base rubber on a side adjacent to a belt layer, that hollow particles having a mean particle diameter of at most 500 μm are mixed in a volume ratio of 2% to 40% into the base rubber, and that a thickness of the base rubber is made to be at least 1.0 mm.

2 Claims, 3 Drawing Sheets

PNEUMATIC TIRE HAVING HOLLOW PARTICLES IN BASE RUBBER

BACKGROUND OF THE INVENTION

1. Field of the Invention

The present invention relates to a pneumatic tire that achieves reduction in road noise, in particular, the noise inside a vehicle produced due to tire vibration when the vehicle drives on a rough road surface, without degrading steering stability.

2. Description of the Background Art

Conventionally, methods of reducing the noise inside a vehicle produced due to tire vibration when the vehicle drives on a rough road surface, i.e., road noise, are attempted.

For instance, there has been suggested a method of reducing tire vibration in which a tread portion is formed as a two-layer structure of cap rubber and base rubber, and at the same time, a rubber composition having large hysteresis loss or rubber having low modulus of elasticity is utilized for cap rubber to reduce the rigidity in the tread portion, or a method of reducing tire vibration in which a thickness of the tread portion is increased while the rigidity in a bead portion is reduced so as to reduce the spring constant of the overall tire. Such methods, however, would degrade steering stability due to reduction in tire rigidity, and thus are not practical solutions.

On the other hand, in Japanese Patent Laying-Open No. 2-60803, a method is proposed in which low hardness vulcanized rubber having a carbon black content of at most 20 parts by weight in the form of particles having a mean particle diameter of 100 to 1000 $\mu$m is evenly dispersed in the cap rubber, in a volume fraction of 3% to 10% in relation to the entire cap rubber of a two-layered tread portion. Even with such method, however, no tire can be produced that achieves both road noise reduction and good steering stability at the same time.

SUMMARY OF THE INVENTION

The object of the present invention is to provide a pneumatic tire that achieves reduction in road noise due to tire vibration when a vehicle drives on a rough road surface, without degrading steering stability.

The present invention is a pneumatic tire characterized in that a tread portion is formed by at least two layers consisting of cap rubber on a road-contact surface side and base rubber on a side adjacent to a belt layer, where hollow particles having a mean particle diameter of at most 500 $\mu$m are mixed in a volume ratio of 2% to 40% into said base rubber, and a thickness of the base rubber is made to be at least 1.0 mm.

Moreover, the hollow particles preferably have strength of a rate of break down of at most 40% at a hydrostatic pressure of 500 kg/cm$^2$.

Further, a thickness of the base rubber is preferably in a range of 1.0 mm to 5.0 mm.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
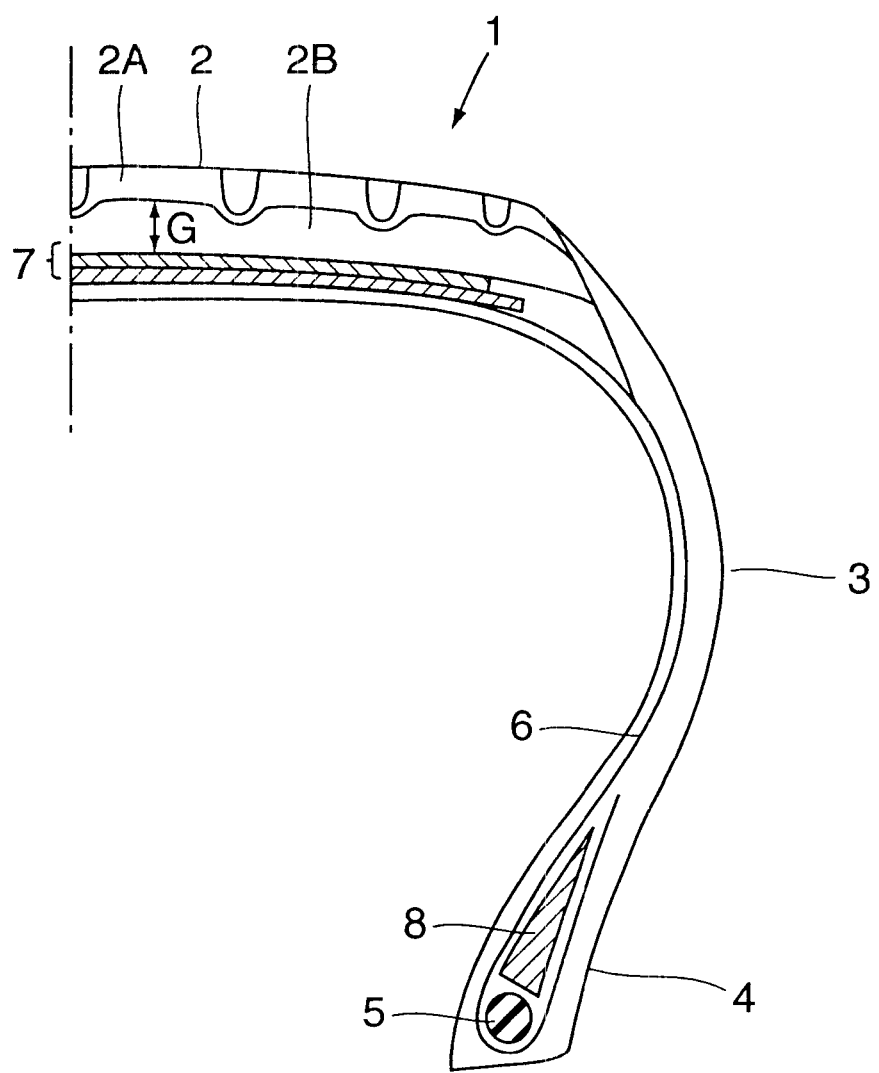
FIG. 1 is a cross sectional view showing the right half of a pneumatic tire of the present invention.
Figure 2:
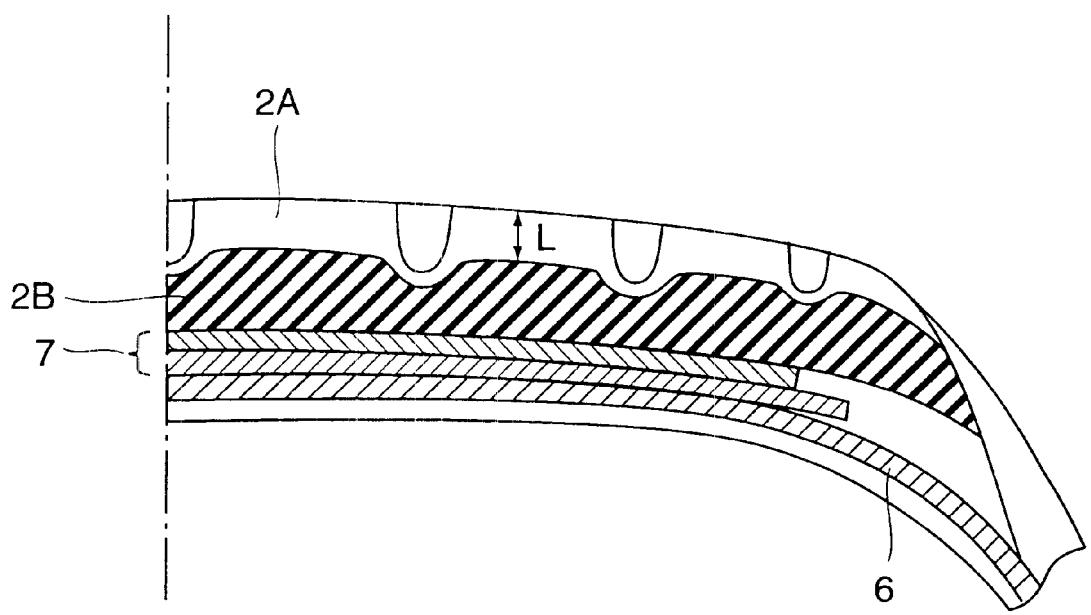
FIG. 2 is an enlarged view of a tread portion in FIG. 1.

FIG. 1 is a cross sectional view showing the right half of a pneumatic tire of the present invention, and FIG. 2 is an enlarged view of a tread portion thereof.

In the drawings, a pneumatic tire 1 has a tread portion 2, a side-wall portion 3, and a bead portion 4. In addition, a bead core 5 is embedded in a bead portion 4, and a carcass 6 is arranged which extends from one bead portion 4 to the other bead portion 4 and whose ends fold over and are fixed around bead cores 5. A belt layer 7 made of two plies is arranged on the outer side of a crown portion of the carcass. Moreover, tread portion 2 is formed of two layers consisting of cap rubber 2A on a road-contact surface side and base rubber 2B on the side adjacent to the belt layer.

Hollow particles are mixed into the base rubber 2B. The hollow particles having a mean particle diameter of at most 500 $\mu$m are used. When the mean particle diameter exceeds 500 $\mu$m, the strength of the base rubber is degraded so that the hollow particles would be destroyed when they are kneaded with the rubber. The mean particle diameter is preferably in a range of 20 $\mu$m to 400 $\mu$m, and more preferably in a range of 40 $\mu$m to 200 $\mu$m. When the mean particle diameter is too small, the vibration generated during driving cannot be sufficiently inhibited so that the effect of road noise reduction becomes small. The hollow particles of various particle diameters may be mixed.

In addition, the hollow particles preferably have strength of a rate of break down of at most 40% at a hydrostatic pressure of 500 kg/cm$^2$. When a r base rubber composition is produced, the hollow particles are kneaded with the rubber with a roll or a kneader. At this time, a larger part of the hollow particles can be destroyed due to pressure, shearing force and so on, in which case the effect of reduction in vibration by the hollow particles cannot be expected.

Figure 3:
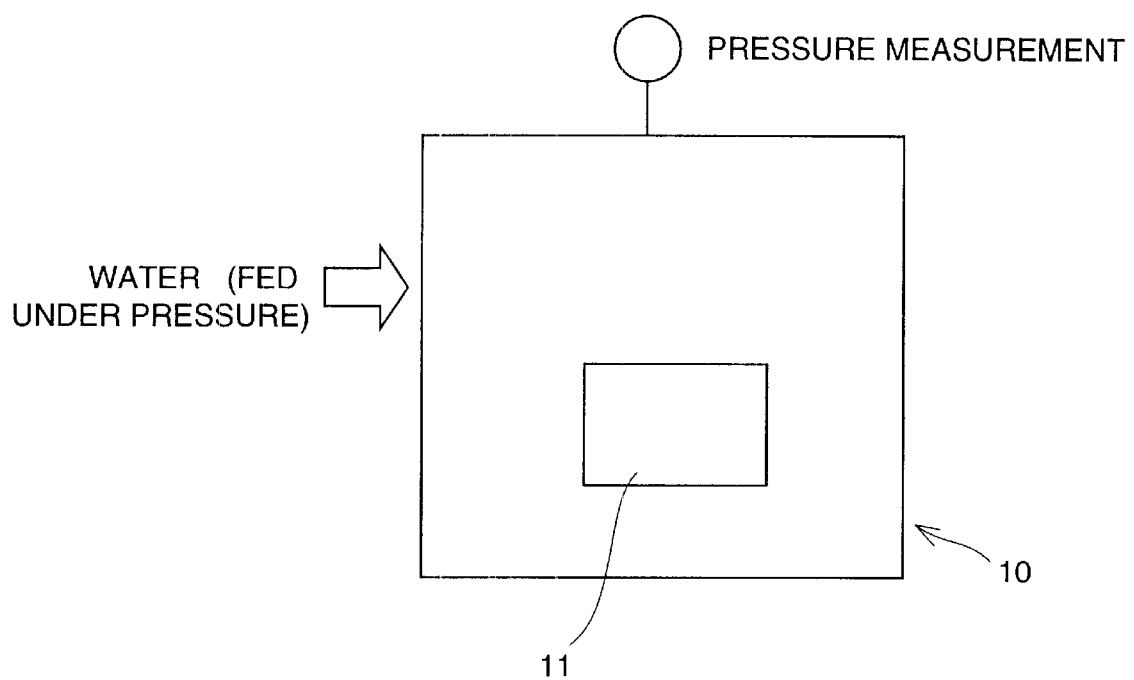
FIG. 3 is a schematic view representing a method of measuring a rate of break down.

Measurement of the rate of break down is conducted in the following manner. Referring to FIG. 3, hollow particles and glycerol are mixed in a volume proportion of 50:50, and are packed into a package 11. Package 11 is placed into a pressure vessel 10, and the pressure is held at a prescribed hydrostatic pressure (500 kg/cm$^2$). The rate of break down is represented by a rate of volume decrease in the hollow particles. The formula is as indicated below.

Rate of break down (rate of volume decrease)=$(1-A1/A2)\times100$, where

A1 is a true density of hollow particles before pressure treatment, and

A2 is a true density of hollow particles after pressure treatment.

Then, hollow particles are mixed in a volume ratio of 2% to 40% into the base rubber. The volume ratio is preferably in a range of 5% to 25%. Here, the volume of the hollow particles before they are kneaded with the rubber is calculated, and the volume ratio of the hollow particles is calculated as a volume ratio (%) with respect to the vulcanized base rubber. When the volume ratio is less than 2%, little effect of road noise reduction can be achieved. On the other hand, the volume ratio exceeding 40% results in degradation in durability of the base rubber as well as in a higher cost of the hollow particles.

Possible types of hollow particles employed in the present invention include glass balloon, silica balloon, Shirasu balloon, phenol balloon, vinylidene chloride balloon, alumina balloon, zirconia balloon, and the like, but are not limited to these examples. One type of hollow particles or a multiple types of hollow particles mixed together may be used.

Moreover, a thickness (G) of the base rubber is preferably in a range of 1.0 mm to 5.0 mm. When the thickness (G) of the base rubber is less than 1.0 mm, the effect of road noise reduction cannot be expected. On the other hand, when the thickness (G) exceeds 5.0 mm, a thickness (L) of the cap rubber becomes extremely thin with certain sizes of pneumatic tires so that, when the tread portion wears down to a certain degree, the base rubber becomes exposed on the tread surface, resulting in degradation in wear resistance and performance such as grip performance. The tread portion is configured such that the boundary between the base rubber and the cap rubber is located on the inner side of a wear indicator of the tire tread portion.

In the case where the thickness of the base rubber changes from the central portion of the tire toward its end direction as shown in FIG. 2, the thickness (G) of the base rubber signifies the average thickness of the base rubber.

In addition, the "base rubber" according to the present invention can be formed as one layer or by multiple layers, and is a concept encompassing an under tread located above the belt layer. When the base rubber is formed by multiple layers, it is possible to mix the hollow particles into only one of the layers.

Moreover, the use of relatively soft rubber having a JIS-A hardness of 45 to 60 in a rubber formulation excluding hollow particles for the base rubber can achieve reduction in road noise along with the effect of inhibiting tire vibration by hollow particles.

According to the present invention, possible rubber components for the rubber composition of the base rubber include natural rubber, polyisoprene rubber, emulsion-polymerized styrene-butadiene copolymer rubber, solution-polymerized styrene-butadiene copolymer rubber (styrene content of 10 wt % to 50 wt %, 1,2 bonding content of 10% to 70%), styrene-butadiene copolymer rubber with high trans structure, low-cis polybutadiene rubber, high-cis polybutadiene rubber, styrene-isoprene copolymer rubber, butadiene-isoprene copolymer rubber, solution-polymerized styrene-butadiene-isoprene copolymer rubber, emulsion-polymerized styrene-acrylonitrile-butadiene copolymer rubber, and so on. Particularly, a rubber component generally used for tire tread rubber, such as natural rubber, polyisoprene rubber, polybutadiene rubber, or styrene-butadiene copolymer rubber, is preferred.

In addition, according to the present invention, carbon black, for instance, of a grade from the variety of FEF, HAF, ISAF, SAF, and the like is used for the base rubber composition, and the amount of carbon black is usually in the range of 10 to 120 parts by weight.

In the base rubber composition, other ingredients, for instance, vulcanizing agents such as sulfur and peroxide, vulcanization accelerators such as thiazoles, thiurams, sulfen amides, and guanidines, vulcanizing auxiliary agents such as stearic acid and zinc oxide, activators such as diethylene glycol and polyethylene glycol, fillers, plasticizers, antioxidants, and process oils are also mixed.

According to the present invention, cap rubber 2A employs a rubber composition that is conventionally and commonly used, and the rubber formulation is designed with excellent wear resistance, grip performance, and chipping-resistant characteristic. In addition, JIS-A hardness is preferably in a range of 55 to 70 and set higher than the hardness of the base rubber so that the steering stability can be further improved.

According to the present invention, the base rubber and the cap rubber can be produced using a known tire production method. For instance, a sheet-like material for the base rubber and a sheet-like material for the cap rubber are separately formed by extrusion from an unvulcanized, rubber composition, and one sheet-like material is superposed over the other to form a tire tread material. Then, this tire tread material is combined together with other tire component materials so as to produce a green tire, and the green tire is molded and vulcanized to produce a tire.

In belt layer 7 of the pneumatic tire of FIG. 1, two plies formed by cords of steel, aramid, and the like are disposed such that they cross one another usually at an angle of 5 degrees to 30 degrees with respect to the circumferential direction of the tire. In addition, in a carcass, organic fiber cords of polyester, nylon, aramid, and the like are arranged at substantially 90 degrees with respect to the circumferential direction of the tire. Preferably, in a region surrounded by the carcass and its folded-over portion, a bead apex 8 of hard rubber having a JIS-A hardness of 70 to 95 that extends from an upper end of bead core 5 toward the side-wall direction is disposed.

Moreover, the cross sectional shape, the structure using a reinforcing member, and the material of the pneumatic tire may be altered according to the category of the tire, for instance, the tire for a passenger car, for a light truck, or for a truck/bus.

Further, the present invention is not limited to pneumatic radial tires, but is also applicable to bias tires and belted-bias tires.

Embodiments

With the structure shown in FIGS. 1 and 2, a radial tire prototype for passenger car whose tire size is TL225/55R16 was produced. A polyester cord layer having the cords arranged at an angle of 90 degrees to the circumferential direction of the tire was used for the tire carcass, and two plies in which steel cords of the plies were crossed at 22 degrees with respect to the circumferential direction of the tire were used for the belt layer.

Table 1 shows the formulation of the base rubber. Table 2 shows the mixing specification of hollow particles in the base rubber. Steering stability and road noise of the prototype tires were measured by the following methods. Moreover, the average thickness (L) of the cap rubber was 8 mm, and the JIS-A hardness of the cap rubber was 67.

TABLE 1

|  |  | Formulation of base rubber (PHR) |
|---|---|---|
| Styrene-butadiene copolymer rubber | Note 1) | 100 |
| Carbon black | Note 2) | 80 |
| Zinc oxide | Note 3) | 3.0 |
| Stearic acid |  | 2.0 |
| Antioxidant | Note 4) | 2.0 |
| Wax | Note 5) | 2.0 |
| Aromatic oil | Note 6) | 25 |
| Sulfur |  | 2.0 |
| Vulcanization accelerator | Note 7) | 1.8 |
| Hollow particles |  | Variable amount |

Note 1) Nipol 1502 (Emulsion SBR) Produced by Zeon Corporation
Note 2) Sho-Black N351 Produced by Showa Cabot Kabushiki Kaisha
Note 3) Zinc Oxides 3 Types Produced by Mitsui Kinzoku Kougyo
Note 4) Antigen 6C Produced by Sumitomo Chemical Co., Ltd.
Note 5) OZOACE-0355 Produced by Nippon Seiro Co., Ltd.
Note 6) Process X-140 Produced by Japan Energy Corp.
Note 7) Nocceller CZ Produced by Ouchishinko Chemical Industrial Co., Ltd.

TABLE 2

|  |  | First embodiment | Second embodiment | First comparative example | Second comparative example | Third comparative example | Fourth comparative example | Fifth comparative example | Sixth comparative example |
|---|---|---|---|---|---|---|---|---|---|
| Base rubber | Type of hollow particles | Glass balloon | Glass balloon | — | Glass balloon | Shirasu balloon | Glass beads | Glass balloon | Note 1) Rubber powder |
|  | Mean particle diameter of hollow particles ($\mu$m) | 100 | 100 | — | 100 | 100 | 100 | 100 | 100 |
|  | Rate of break down of hollow particles (%) | 5 | 5 | — | 5 | 90 | 0 | 5 | — |
|  | Average volume ratio of hollow particles (%) | 5 | 20 | 0 | 1 | 5 | 5 | 5 | 5 |
|  | Thickness (G) mm of base rubber | 2 | 2 | 2 | 2 | 2 | 2 | 0.5 | 2 |
|  | JIS-A hardness of base rubber Note 2) | 57 | 65 | 53 | 57 | 56 | 57 | 57 | 49 |
| Performance evaluation | Steering stability | 7 | 9 | 5 | 5 | 4 | 8 | 5 | 3 |
|  | Road noise | 8 | 8 | 5 | 6 | 4 | 5 | 5 | 7 |

Note 1) Employed powder having hardness lower than hardness of base rubber by 25 degrees
Note 2) Indicates JIS-A hardness of rubber formulation that contains hollow particles (1) Steering Stability Actual driving was conducted on a dry road surface at 50 to 80 km/h, and the steering stability during straight-ahead driving and upon cornering was evaluated based on the impression the driver received. The steering stability was rated using ten grade levels, with the first comparative example being rated as 5 points. Greater numbers indicate better steering stability.

(2) Road Noise

The road noise was evaluated based on the impression the driver received while on a vehicle and driving on a rough road surface at 50 to 80 km/h. The road noise was rated using ten grade levels, with the first comparative example being rated as 5 points. Greater numbers indicate better reduction of road noise.

In Table 2, the first comparative example does not have hollow particles mixed into the base rubber. In the second comparative example, the volume ratio of hollow particles is as small as 1% so that the effect of road noise reduction is small.

The third comparative example employs Shirasu balloon with low strength so that the rate of break down is great even though the volume ratio of the hollow particles is 5%, and no effect of road noise reduction is achieved.

The fourth comparative example employs non-hollow glass beads so that no effect of road noise reduction is achieved.

In the fifth comparative example, the thickness of the base rubber having hollow particles mixed therein is 0.5 mm and thus smaller than 1.0 mm so that no road noise reduction is achieved.

In the sixth comparative example, the base rubber has low hardness rubber particles mixed therein so that some reduction in road noise is achieved, but the rigidity of the tread portion is insufficient, resulting in degraded steering stability.

Significant improvement in both the road noise reduction and the steering stability is noted in the first embodiment and the second embodiment of the present invention.

As described above, according to the present invention, hollow particles of a prescribed amount is mixed into the base rubber so that good steering stability can be maintained and further reduction in road noise can be achieved, as opposed to the case in which low hardness vulcanized rubber particles are mixed into the tread rubber or the case in which foamed rubber is used in the tread portion, which in either case brings about the degradation in rigidity of the tread portion, Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A pneumatic tire, comprising a tread portion formed by at least two layers consisting of cap rubber on a road-contact surface side and base rubber on a side adjacent to a belt layer, wherein hollow particles having a mean particle diameter of at most 500 $\mu$m and strength of a rate of break down of at most 40% at a hydrostatic pressure of 500 kg/cm$^2$ are mixed in a volume ratio of 2% to 40% into said base rubber, and a thickness of the base rubber is made to be at least 1.0 mm.

2. The pneumatic tire according to claim 1, wherein a thickness of base rubber is in a range of 1.0 mm to 5.0 mm.

* * * * *

UNITED STATES PATENT AND TRADEMARK OFFICE
CERTIFICATE OF CORRECTION

PATENT NO.    : 6,626,216 B2  
DATED         : September 30, 2003  
INVENTOR(S)   : Akira Minagoshi It is certified that error appears in the above-identified patent and that said Letters Patent is hereby corrected as shown below:

<u>Title page,</u>  
Item [73], Assignee, change "Nokia Corporation, Espoo (FI)" to read -- The Ohtsu Tire & Rubber Co., LTD, Osaka, (JP) --.  
Item [74], *Attorney, Agent, or Firm*, change "Squire, Sanders & Dempsey L.L.P." should read -- Birch, Stewart, Kolasch & Birch, LLP --.

Signed and Sealed this

Sixth Day of January, 2004

JAMES E. ROGAN  
*Director of the United States Patent and Trademark Office*